United States Patent
Min et al.

(10) Patent No.: US 10,996,500 B2
(45) Date of Patent: May 4, 2021

(54) OPTICAL SHEET AND BACKLIGHT UNIT HAVING SAME

(71) Applicant: LMS Co., Ltd., Pyeongtaek-si (KR)

(72) Inventors: Jee Hong Min, Seongnam-si (KR); Ki Wook Lee, Anyang-si (KR); Byoung Hun Lee, Osan-si (KR); Tae Jun Lee, Osan-si (KR); Dong Cheol Lee, Suwon-si (KR); Se Jin Oh, Hwaseong-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 0 days.

(21) Appl. No.: 15/563,911

(22) PCT Filed: Mar. 24, 2016

(86) PCT No.: PCT/KR2016/002952
§ 371 (c)(1),
(2) Date: Oct. 2, 2017

(87) PCT Pub. No.: WO2016/159563
PCT Pub. Date: Oct. 6, 2016

(65) Prior Publication Data
US 2018/0120626 A1    May 3, 2018

(30) Foreign Application Priority Data
Apr. 3, 2015    (KR) .................. 10-2015-0047246

(51) Int. Cl.
*G02F 1/1335*    (2006.01)
*G02F 1/13357*   (2006.01)
*F21V 8/00*      (2006.01)

(52) U.S. Cl.
CPC ..... *G02F 1/133504* (2013.01); *G02B 6/0016* (2013.01); *G02B 6/0025* (2013.01);
(Continued)

(58) Field of Classification Search
CPC ................................................ G02F 1/133504
See application file for complete search history.

(56) References Cited

U.S. PATENT DOCUMENTS

| | | | |
|---|---|---|---|
| 2004/0228106 A1* | 11/2004 | Stevenson | G02B 5/045 |
| | | | 362/627 |
| 2009/0097273 A1* | 4/2009 | Chang | G02B 6/0055 |
| | | | 362/618 |

(Continued)

FOREIGN PATENT DOCUMENTS

| | | | |
|---|---|---|---|
| JP | 08-184704 A | 7/1996 | |
| JP | 10-048430 | * 2/1998 | ............... G02B 6/00 |

(Continued)

OTHER PUBLICATIONS

International Search Report dated Jul. 25, 2016 issued in parent application PCT/KR2016/002952.

(Continued)

*Primary Examiner* — Sang V Nguyen
(74) *Attorney, Agent, or Firm* — Polsinelli PC

(57) ABSTRACT

The present disclosure relates to an optical sheet having improved optical properties and minimized surface spots. According to one aspect of the present disclosure, provided is an optical sheet comprising: a first prism sheet which has a plurality of prisms parallel in a first direction formed on one surface thereof; and a diffusion sheet which is positioned at the surface side into which light of the first prism sheet is incident and has a plurality of protrusions formed on the surface facing the first prism sheet.

18 Claims, 10 Drawing Sheets

(52) U.S. Cl.
CPC ..... *G02B 6/0051* (2013.01); *G02F 1/133602* (2013.01); *G02F 1/133606* (2013.01); *G02B 6/0053* (2013.01); *G02B 6/0065* (2013.01); *G02F 1/133607* (2021.01)

(56) References Cited

U.S. PATENT DOCUMENTS

| | | | | |
|---|---|---|---|---|
| 2011/0051047 | A1* | 3/2011 | O'Neill | G02B 6/0096 349/67 |
| 2012/0127697 | A1* | 5/2012 | Kim | B32B 37/26 362/97.2 |
| 2015/0138781 | A1* | 5/2015 | Cho | G02B 5/0226 362/339 |
| 2015/0301264 | A1* | 10/2015 | Min | G02B 5/0231 362/343 |
| 2016/0334564 | A1* | 11/2016 | Cho | G02F 1/133528 |
| 2017/0322348 | A1* | 11/2017 | Shimamura | G02B 5/0231 |

FOREIGN PATENT DOCUMENTS

| | | | | |
|---|---|---|---|---|
| JP | 10-048430 A | | 2/1998 | |
| JP | 10048430 | * | 2/1998 | ............... G02B 6/00 |
| JP | 2004-038155 A | | 2/2004 | |
| JP | 2006-048084 A | | 2/2006 | |
| JP | 2007-156014 A | | 6/2007 | |
| JP | 2007-156038 A | | 6/2007 | |
| JP | 2007-178792 A | | 7/2007 | |
| JP | 2007-178976 A | | 7/2007 | |
| JP | 2008-218207 A | | 9/2008 | |
| JP | 2013107281 | * | 6/2013 | ............... B32B 7/06 |
| JP | 2007-078881 A | | 3/2017 | |
| KR | 10-2009-0096374 A | | 9/2009 | |
| KR | 20090096374 | * | 9/2009 | ............... B32B 7/02 |
| KR | 10-2012-0014460 | * | 2/2012 | ............... G02B 5/04 |
| KR | 10-1269190 B1 | | 5/2013 | |
| KR | 10-1321718 B1 | | 10/2013 | |
| KR | 10-2014-0053497 A | | 5/2014 | |

OTHER PUBLICATIONS

Japanese Office Action dated Sep. 5, 2018 in corresponding Patent Application No. 2017-550933 (5 pages).
Japanese Office Action dated Jul. 30, 2019 in corresponding Patent Application No. 2017-550933 (4 pages).
Decision of Refusal dated Apr. 7, 2019 in corresponding Patent Application No. 2017-550933 (1 page).
2nd Decision of Refusal dated Apr. 7, 2019 in corresponding Patent Application No. 2017-550933 (3 pages).

\* cited by examiner

FIG.7

| distance of air layer | 1.5~10μm | 2.2~4μm | 3.0~1μm |
|---|---|---|---|
| luminance (Cen) | 89.9% | 89.5% | 75.4% |
| luminance (Max) | 108.9% | 107.4% | 103.4% |

OPTICAL SHEET AND BACKLIGHT UNIT HAVING SAME

CROSS-REFERENCE TO RELATED APPLICATION

The present application claims the benefit of Korean Patent Application No. 10-2015-0047246 filed on Apr. 3, 2015 and PCT Application No. PCT/KR2016/002952 filed on Mar. 24, 2016, which are hereby incorporated by reference in their entirety.

BACKGROUND

Field of the Disclosure

The present disclosure relates to an optical sheet, and more particularly, to an optical sheet having improved optical properties and minimized surface spots.

Description of the Background

Generally, a liquid crystal display (LCD) requires a backlight module that provides uniform light to an entire screen, unlike a conventional CRT.

FIG. 1 is an exploded perspective view showing a conventional backlight module.

As shown in FIG. 1, the conventional backlight module may include a lamp 1 and a lamp reflector for reflecting light of the lamp 1 disposed in one side of a light guide plate 2 for converting the light from the lamp 1 into a surface light source, and a reflective sheet 3 for preventing leakage of light disposed on a lower side of the light guide plate 2.

A diffusion sheet 4 for uniformly diffusing light may be provided on an upper side of the light guide plate 2, and a prism sheet portion 5 having a plurality of triangular linear prisms protruding upward to collect scattered light may be placed on the diffusion sheet 4. The prism sheet portion 5 may have a plurality of linear prisms which are arranged to collect light, and a protective sheet 6, which is disposed on the prism sheet portion 5, for preventing defects such as a scratch of prism shape or an impaction due to foreign matter.

As shown in FIG. 2, the prism sheet portion 5 may include two sheets of a first prism sheet 51 and a second prism sheet 52. A plurality of prisms 53 may be arranged in parallel on one surface of the first prism sheet 51 and a plurality of prisms 54 may be arranged on one surface of the second prism sheet 52 in a direction orthogonal to the prism 53 of the first prism sheet 51 so that the light in different directions may be collected and a light collection efficiency may be enhanced.

Despite such a structure, as the luminance is unsatisfactory, there is a need to further improve optical properties.

(Patent Document 1) Korean Patent Laid-Open No. 10-2013-0107645

SUMMARY

The present disclosure has been made in view of the above problems, and provides an optical sheet capable of further improving optical properties such as luminance and the like.

The problems of the present disclosure are not limited to the above-mentioned problems, and other problems not mentioned can be clearly understood by those skilled in the art from the following description.

In an aspect, there is provided an optical sheet, including: a first prism sheet which has a plurality of prisms parallel in a first direction formed on one surface thereof; and a diffusion sheet which is positioned at a surface side into which light of the first prism sheet is incident, and has a plurality of protrusions formed on a surface facing the first prism sheet.

The optical sheet further includes a second prism sheet which is positioned at a surface side to which the light of the first prism sheet is emitted, and has a plurality of prisms parallel in a second direction crossing the first direction formed on one surface thereof.

The protrusion includes a plurality of first protrusions formed on the surface facing the first prism sheet; and a second protrusion formed on the surface facing the first prism sheet to have a height higher than the first protrusion.

The second protrusion is made of an adhesive material and is formed to adhere and fix the first prism sheet and the diffusion sheet.

An air layer is formed in a gap between the first protrusion and the first prism sheet, between the diffusion sheet and the first prism sheet.

A width of the second protrusion is narrower than a width of the first protrusion.

A tip of the second protrusion is sharply pointed.

An irregularity is formed on a surface into which the light of the first prism sheet is incident.

The irregularity is made of an adhesive material, and is formed to be in contact with the second protrusion to fix the second protrusion so that the first prism sheet and the diffusion sheet are adhered and fixed.

A thickness of the air layer ranges from 5 μm to 10 μm.

There is provided a backlight unit including the optical sheet.

An optical sheet, a backlight unit having the same, and a liquid crystal display device including the same according to the present disclosure have the following effects.

First, there is an effect that optical properties are improved, for example, luminance is increased.

Second, a contact area between a diffusion sheet and a prism sheet is minimized, so that a stained portion of the diffusion sheet such as a spot can be minimized.

The effects of the present disclosure are not limited to the effects mentioned above, and other effects not mentioned can be clearly understood by those skilled in the art from the description of the claims.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the application, illustrate aspects of the disclosure and together with the description serve to explain the principle of the disclosure.

In the drawings:

FIG. 7 is a view showing an optical property difference according to a distance between the diffusion sheet and the prism sheet of FIG. 3;

DETAILED DESCRIPTION

Figure 1:
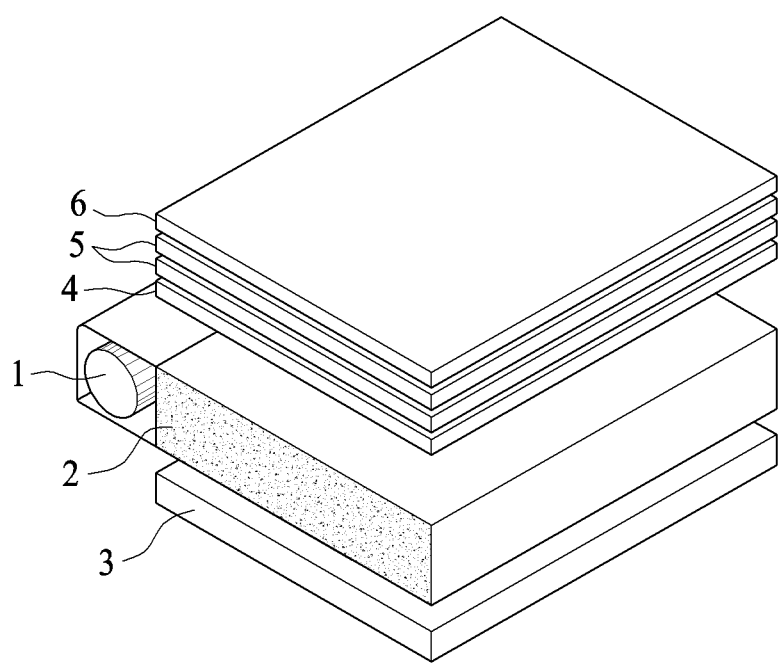
FIG. 1 is an exploded perspective view showing a conventional backlight module.
Figure 2:
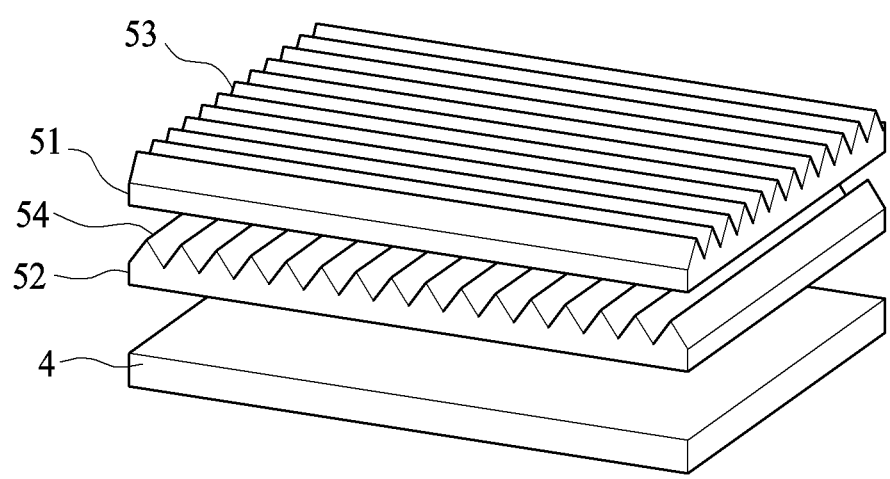
FIG. 2 is an enlarged perspective view of a prism sheet portion and a diffusion sheet of FIG. 1.

Hereinafter, aspects of the present disclosure will be described with reference to the accompanying drawings. In describing the present aspect, the same designations and the same reference numerals are used for the same components, and further description thereof will be omitted.

In the following description, it is illustrated that an optical sheet according to the present aspect is applied to a backlight module of a display apparatus such as LCD or LED. However, the present disclosure is not limited thereto, and the optical sheet may be used independently, or may be applied to other apparatuses.

Figure 3:
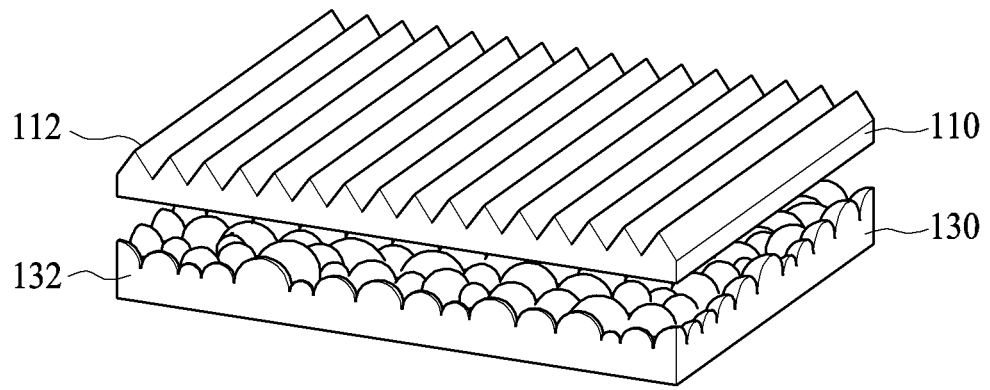
FIG. 3 is an enlarged perspective view of a first prism sheet and a diffusion sheet according to an aspect of the present disclosure.

As shown in FIG. 3, the optical sheet according to the present aspect may include a first prism sheet 110 and a diffusion sheet 130.

In the following description, based on FIG. 3, a direction in which the diffusion sheet 130 faces the first prism sheet 110 may be referred to as one side and the opposite direction may be referred to as the other side. Accordingly, a surface of the first prism sheet 110 facing the diffusion sheet 130 may be the other surface, and the opposite surface may be one surface. In addition, a surface of the diffusion sheet 130 facing the first prism sheet 110 may be one surface, and the opposite surface may be the other surface.

In addition, light may be incident on the diffusion sheet 130 from the other side. That is, the light may be incident from the other surface of the diffusion sheet 130 and emitted to the one surface of the diffusion sheet 130, and the light transmitted through the diffusion sheet 130 may be incident from the other surface of the first prism sheet 110 and emitted to one surface of the first prism sheet 110.

The first prism sheet 110 is a component for collecting light and may have a plurality of fine prisms 112 which are arranged in parallel in a first direction on one surface of the first prism sheet 110.

Figure 4:
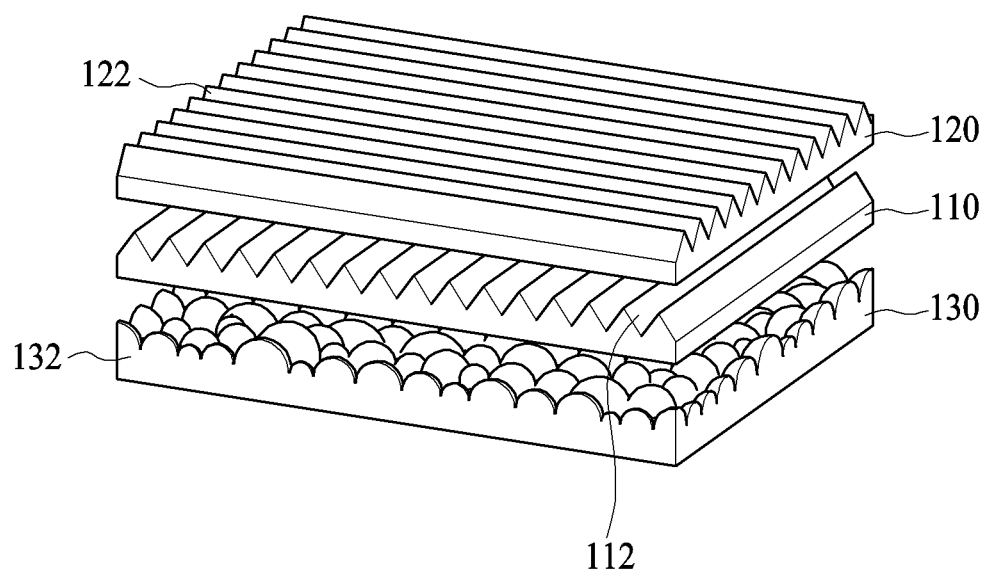
FIG. 4 is a perspective view illustrating a state in which a second prism sheet is added to FIG. 3.

As shown in FIG. 4, a second prism sheet 120 may be provided on one side of the first prism sheet 110. The second prism sheet 120 may have a plurality of prisms 122 which are arranged in parallel on one surface of the second prism sheet 120 in a second direction intersecting the prisms 112 of the first prism sheet 110. At this time, in the present aspect, it is illustrated that the first direction and the second direction are orthogonal to each other. However, the present disclosure is not limited thereto.

The first prism sheet 110 and the second prism sheet 120 may be adhered to each other. Obviously, the present disclosure is not limited thereto, and the first prism sheet 110 and the second prism sheet 120 do not necessarily have to be adhered to each other, but may be placed simply to be superimposed.

The diffusion sheet 130 may be provided on the other side of the first prism sheet 110.

Figure 5:
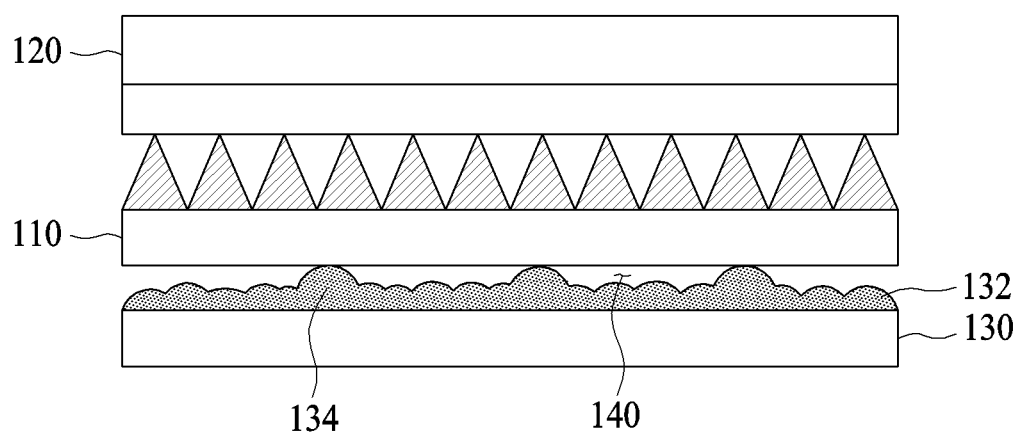
FIG. 5 is a side view of FIG. 4.

The diffusion sheet 130 is a component that diffuses incident light from a light source in such a manner that the light is uniformly emitted throughout a surface. As shown in FIG. 3, FIG. 4, and FIG. 5, protrusions may be formed on a surface of the diffusion sheet 130 facing the first prism sheet 110.

The protrusions may include a plurality of first protrusions 132 and second protrusions 134, and may refract or scatter light emitted from the diffusion sheet, thereby enhancing a diffusion effect.

The first protrusions 132 may generally have a spherical shape and may be formed on the surface of the diffusion sheet 130. The first protrusions 132 may be formed by a method of replicating using a master (not shown), or may be formed in such a manner that diffusion particles such as beads (not shown) may be dispersed in a polymer resin of the diffusion sheet 130 so that a part thereof may be embedded in the polymer resin and the remaining part may be exposed.

In this case, the width of the portion of the first protrusion 132 exposed to the outside of the diffusion sheet 130 may be 50 µm or less and may be about 20 µm, and may have a refractive index ranging from 1.5 to 1.7.

Meanwhile, the first protrusion 132 may be formed of the same material as the diffusion sheet 130, or may be formed of a material such as a poly methyl methacrylate (PMMA) which is a type of acryl, a transparent urethane, or the like.

Similar to the first protrusion 132, the second protrusion 134 may be formed on a surface of the diffusion sheet 130 facing the first prism sheet 110, and may be formed to be higher than the first protrusion 132.

The second protrusion 134 may contact the other surface of the first prism sheet 110 to adhesively fix the first prism sheet 110 and the diffusion sheet 130.

The second protrusion 134 may be formed of the same material as the first protrusion 132 or may be formed of another material. In addition, an adhesive may be applied to the second protrusion 134 to fix the first prism sheet 110 and the diffusion sheet 130 or the second protrusion 134 itself may be made of a resin having adhesive property.

Accordingly, as shown in FIG. 5, since the height of the second protrusion 134 is higher than that of the first protrusion 132, an air layer 140 may be formed between the diffusion sheet 130 and the first prism sheet 110. The thickness of the air layer 140 may be a distance between the first protrusion 132 of the diffusion sheet 130 and the other surface of the first prism sheet 110.

Accordingly, the incident light may be diffused through the diffusion sheet 130 and may be refracted while passing through the air layer 140 having a different refractive index, thereby improving optical properties.

Figure 6:
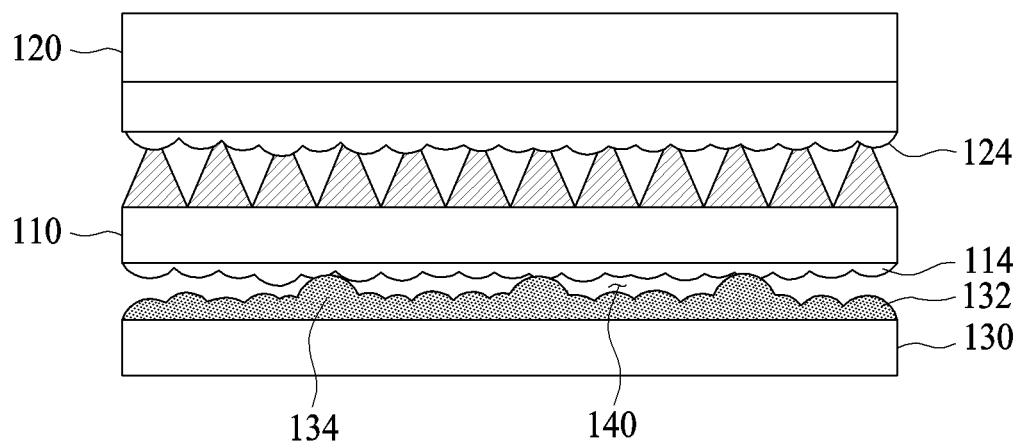
FIG. 6 is a side view showing a state in which adhesive irregularities are formed on the first prism sheet and the second prism sheet of FIG. 4.

Alternatively, as shown in FIG. 6, convex irregularities 114 and 124 may be formed on the other surfaces of the first prism sheet 110 and the second prism sheet 120.

At this time, the irregularities 114 and 124 may diffuse the incident light again to improve uniformity and may serve to adhere to other component.

That is, the irregularities 114 and 124 may be formed of a material having adhesive property and transparency attached to the first prism sheet 110 and the second prism sheet 120 or attached to the first prism sheet 110 and the second protrusions 134 of the first substrate 130. At this time, the material of the irregularities 114 and 124 may be the same as or different from the material of the second protrusion 134.

At this time, the thickness of the air layer 140 may be a distance between the first protrusion 132 of the diffusion sheet 130 and the irregularities 114 and 124 of the first prism sheet 110.

Meanwhile, the height of the second protrusion 134 may be constant.

The first protrusion 132 may directly touch the first prism sheet 110 when the second protrusion 134 of the diffusion sheet 130 is irregular in size and height. Accordingly, the first prism sheet 110 may be bent and, as a result, it is difficult to achieve a uniform light collecting effect. However, when the diffusion sheet 130 and the first prism sheet 110 are adhered to each other through the second protrusion 134 having a constant height as in the present aspect, the bending of the first prism sheet 110 which can be caused due to the irregular height of the first protrusion 132 can be prevented.

Meanwhile, FIG. 7 is a view showing an optical property change according to a distance of the air layer 140.

In FIG. 7, the result value of the left side shows an optical property when the distance of the air layer 140 ranges from 1.5 µm to 10 µm, the result value of the center shows an optical property when the distance of the air layer 140 ranges from 2.2 µm to 4 µm, and the result value of the right side shows an optical property when the distance of the air layer 140 ranges from 3.0 µm to 1 µm.

As shown in FIG. 7, a luminance (Cen) indicates a luminance value of a center portion, and a luminance (Max) indicates a maximum luminance value.

In this case, the luminance (Cen) and the luminance (Max) are expressed as a percentage of the luminance compared to the conventional optical sheet.

As shown in FIG. 7, as the distance between the diffusion sheet 130 and the first prism sheet 110 increases, the luminance (Max) value increases.

Meanwhile, since the second protrusion 134 is in contact with the first prism sheet 110, a part of the incident light may pass through the air layer 140 and may be incident on the first prism sheet 110, and a part of the remaining light may be incident on the first prism sheet 110 through the second protrusion 134.

Figure 8:
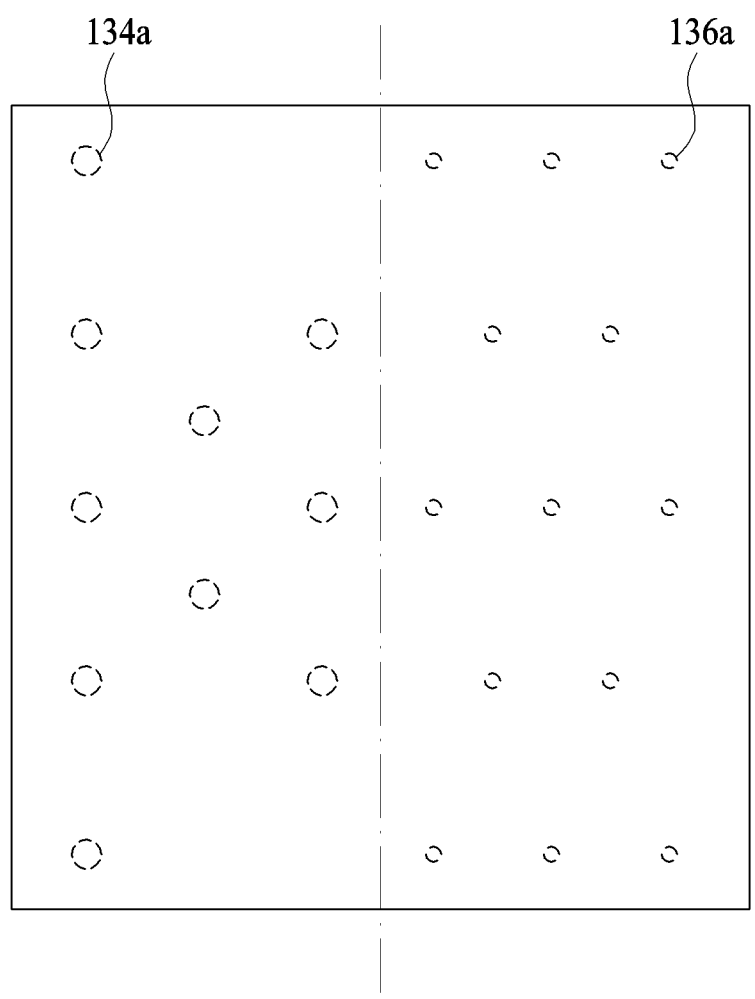
FIG. 8 is a plan view showing a planar stain according to a shape of protrusion.

Therefore, an optical coupling phenomenon that luminance increases in comparison with other portion may occur in the portion with which the second protrusion 134 is in contact, so that a stain 134a caused by a difference in luminance may occur on the surface of the optical sheet, as shown in the left side of FIG. 8.

Figure 9:
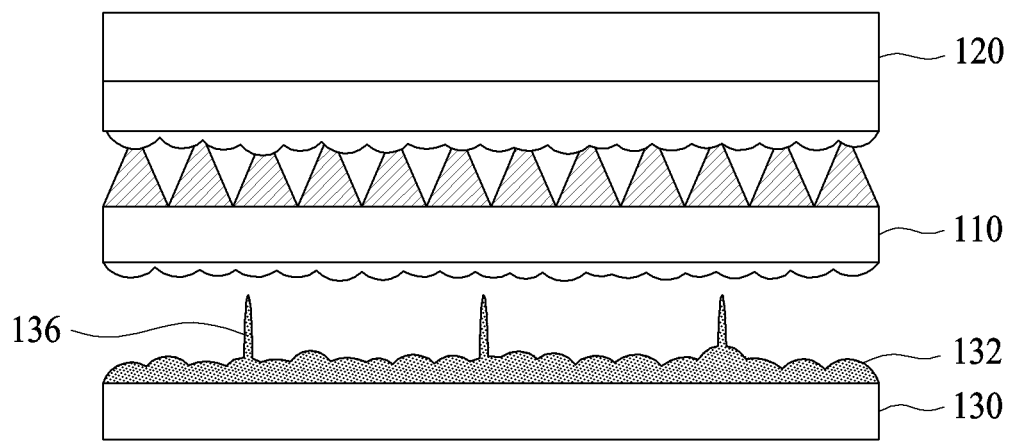
FIG. 9 is a side view showing a prism sheet and a diffusion sheet according to another shape of a second protrusion of the present disclosure.

Accordingly, in order to minimize the stain 134a, as shown in FIG. 9, the width of the second protrusion 136 may be formed to be narrower than that of the first protrusion 132 formed on one surface of the diffusion sheet 130.

In addition, in order to minimize an area of the second protrusion 136 contacting the first prism sheet 110, the tip of the first protrusion 132 may be sharply pointed.

In order to minimize the area of the second protrusion 136 contacting the first prism sheet 110, the second protrusion 134 may not be overlapped with the first protrusion 132 but may be independently formed at different positions. That is, as shown in the left side of FIG. 10, the first protrusion 132 is not formed on the surface of the second protrusion 134.

Therefore, the contact area where the second protrusion 136 and the first prism sheet 110 are in contact with each other can be minimized so that a stain 134b caused by a difference in luminance may be minimized on the surface of the optical sheet, as shown in the right side of FIG. 8.

Figure 10:
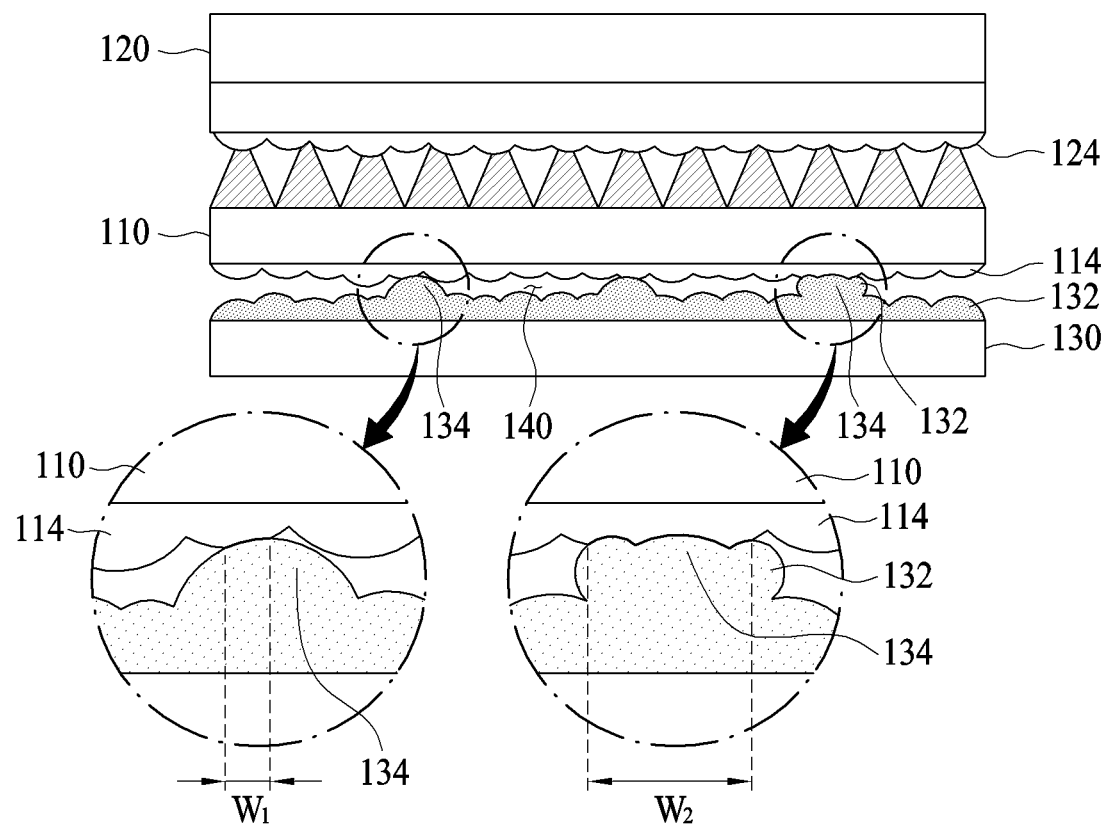
FIG. 10 is a view showing a contact width with the first prism sheet according to whether the first protrusion and the second protrusion of the present disclosure are independently formed.

That is, the left side of FIG. 10 shows a state in which the first protrusion 132 and the second protrusion 134 are independently formed at different positions, and the right side of FIG. 10 shows a state in which the first protrusion 132 and the second protrusion 134 are overlapped with each other so that the first protrusion 132 is formed on the surfaces of the second protrusion 134.

As shown in the left side of FIG. 10, the width W1 of the contact area with which the protrusion of the diffusion layer 130 and the irregular portion 114 of the first prism sheet 110 are in contact when the first protrusion 132 and the second protrusion 134 are independently formed at different positions may be significantly smaller than the width W2 of the contact area with which the protrusion of the diffusion layer 130 and the irregular portion 114 of the first prism sheet 110 are in contact when the first protrusion 132 and the second protrusion 134 are overlapped with each other so that the first protrusion 132 is formed on the surfaces of the second protrusion 134.

Therefore, when the first protrusion 132 and the second protrusion 134 are independently formed at different positions, the stain 134b caused by a difference in luminance may be minimized on the surface of the optical sheet.

In the meantime, in the above description, it is illustrated that the prism sheet is formed of a first prism sheet and a second prism sheet which are formed to intersect with each other in the forming direction of the prism. However, the present disclosure is not limited thereto but is applicable regardless of the number of the prism sheets.

Although the exemplary aspects of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described aspects but is defined by the appended claims as well as equivalents thereto.

What is claimed is:
1. An optical sheet comprising:
a first prism sheet having first and second sides and including a plurality of prisms disposed on the first side parallel in a first direction formed on one surface thereof and an uneven surface formed on the second side; and
a diffusion sheet having a plurality of second protrusions directly contacting the uneven surface of the second side of the first prism sheet and a plurality of first protrusions not directly contacting the first prism sheet,
wherein the uneven surface having a transparent adhesive property adheres the first prism sheet and the diffusion sheet and diffuses incident light,
wherein the plurality of prisms has a uniform height,
wherein the plurality of second protrusions has a height greater than the plurality of first protrusions,
wherein the plurality of second protrusions is directly attached to the uneven surface of the second side of the first prism, and
wherein the plurality of second protrusions has a width narrower than a width of the plurality of first protrusions.
2. The optical sheet of claim 1, further comprising a second prism sheet which is positioned on the first side to which light of the first prism sheet is emitted, and having a plurality of prisms in a second direction crossing the first direction.

3. The optical sheet of claim 1, wherein the plurality of first protrusions has different heights; and
the plurality of second protrusions has a same height.

4. The optical sheet of claim 3, wherein the plurality of second protrusions is made of an adhesive material to adhere and fix the first prism sheet and the diffusion sheet.

5. The optical sheet of claim 3, further comprising an air layer between the plurality of first protrusions and the first prism sheet.

6. The optical sheet of claim 3, wherein a tip of the plurality of second protrusions has a sharply pointed tip.

7. The optical sheet of claim 3, wherein the uneven surface is formed on a surface into which light of the first prism sheet is incident.

8. The optical sheet of claim 7, wherein the uneven surface is made of an adhesive material to adhere and fix the first prism sheet and the diffusion sheet.

9. The optical sheet of claim 5, wherein the air layer has a thickness in a range of 5 μm to 10 μm.

10. A backlight unit comprising:
a first prism sheet having first and second sides and including a plurality of prisms disposed on the first side in a first direction and an uneven surface formed on the second side;
a diffusion sheet having a plurality of second protrusions directly contacting the uneven surface of the second side of the first prism and a plurality of first protrusions not directly contacting the first prism sheet; and
a light source coupled to the first prism sheet and the diffusion sheet,
wherein the uneven surface having a transparent adhesive property adheres the first prism sheet and the diffusion sheet and diffuses incident light,
wherein the plurality of prisms has a uniform height,
wherein the plurality of second protrusions has a height greater than the plurality of first protrusions,
wherein the plurality of second protrusions is directly attached to the uneven surface of the second side of the first prism, and
wherein the plurality of second protrusions has a width narrower than a width of the plurality of first protrusions.

11. An optical sheet comprising:
a first prism sheet having first and second sides and including a plurality of prisms disposed on the first side in a first direction and a first uneven surface formed on the second side;
a second prism sheet having first and second sides, wherein the second prism sheet is positioned on the first side of the first prism sheet to which light of the first prism sheet is emitted, has a plurality of prisms on the first side of the second prism sheet in a second direction crossing the first direction, and has a second uneven surface formed on the second side of the second prism sheet; and
a diffusion sheet having a plurality of second protrusions directly contacting the uneven surface of the second side of the first prism and the plurality of first protrusions of the diffusion sheet not directly contacting the first prism sheet,
wherein the first uneven surface having a transparent adhesive property adheres the first prism sheet to the diffusion sheet and diffuses incident light, and the second uneven surface having a transparent adhesive property adheres the first prism sheet to the second prism sheet and diffuses the incident light,
wherein the plurality of prisms has a uniform height,
wherein the plurality of second protrusions has a height greater than the plurality of first protrusions,
wherein the plurality of second protrusions is directly attached to the uneven surface of the second side of the first prism, and
wherein the plurality of second protrusions has a width narrower than a width of the plurality of first protrusions.

12. The optical sheet of claim 1, wherein the plurality of first protrusions has different heights; and
the plurality of second protrusions has a same height.

13. The optical sheet of claim 12, wherein the plurality of second protrusions is made of an adhesive material to adhere and fix the first prism sheet and the diffusion sheet.

14. The optical sheet of claim 12, further comprising an air layer between the plurality of first protrusions and the first prism sheet.

15. The optical sheet of claim 12, wherein the plurality of second protrusions has a sharply pointed tip.

16. The optical sheet of claim 12, wherein the uneven surface is formed on a surface into which light of the first prism sheet is incident.

17. The optical sheet of claim 16, wherein the uneven surface is made of an adhesive material to adhere and fix the first prism sheet and the diffusion sheet.

18. The optical sheet of claim 14, wherein the air layer has a thickness in a range of 5 μm to 10 μm.

* * * * *